(12) United States Patent
Kajimoto et al.

(10) Patent No.: US 12,388,940 B2
(45) Date of Patent: Aug. 12, 2025

(54) IMAGE PROCESSING APPARATUS, IMAGE PROCESSING METHOD, AND STORAGE MEDIUM

(71) Applicant: CANON KABUSHIKI KAISHA, Tokyo (JP)

(72) Inventors: Masahiro Kajimoto, Chiba (JP); Kenta Usami, Ibaraki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/435,274

(22) Filed: Feb. 7, 2024

(65) Prior Publication Data
US 2024/0267476 A1    Aug. 8, 2024

(30) Foreign Application Priority Data

Feb. 8, 2023    (JP) ................................. 2023-017586

(51) Int. Cl.
*G06K 15/00*    (2006.01)
*H04N 1/00*    (2006.01)
*H04N 1/32*    (2006.01)

(52) U.S. Cl.
CPC ..... *H04N 1/32128* (2013.01); *H04N 1/00212* (2013.01); *H04N 1/00244* (2013.01)

(58) Field of Classification Search
CPC ........... H04N 1/32128; H04N 1/00212; H04N 1/00244; H04N 1/10; H04L 51/10; H04L 51/224; H04L 51/04
USPC ...................................................... 358/1.15
See application file for complete search history.

(56) References Cited

U.S. PATENT DOCUMENTS

2012/0268766 A1* 10/2012 Okubo ............... H04N 1/33323
                                              358/1.13
2021/0409556 A1* 12/2021 Ushinohama ...... H04N 1/00212

FOREIGN PATENT DOCUMENTS

JP         2021078084 A        5/2021

OTHER PUBLICATIONS

IP.com search history (Year: 2025).*
ProQuest search history (Year: 2025).*

* cited by examiner

*Primary Examiner* — Moustapha Diaby
(74) *Attorney, Agent, or Firm* — Canon U.S.A., Inc. IP Division

(57) ABSTRACT

An image processing apparatus includes a scanning unit configured to scan an image of a document and generate image data, an acceptance unit configured to accept selection of a channel of a chat service, and a transmission unit configured to transmit information about the selected channel and the generated image data to a server configured to manage the chat service, wherein the acceptance unit is further configured to accept designation of reminder timing and a message, wherein the transmitted image data is posted to the selected channel based on the information about the channel, wherein the transmission unit is configured to transmit the message to the server based on the designated timing, and wherein the message is posted to the selected channel based on the information about the channel.

17 Claims, 17 Drawing Sheets

FIG.10A
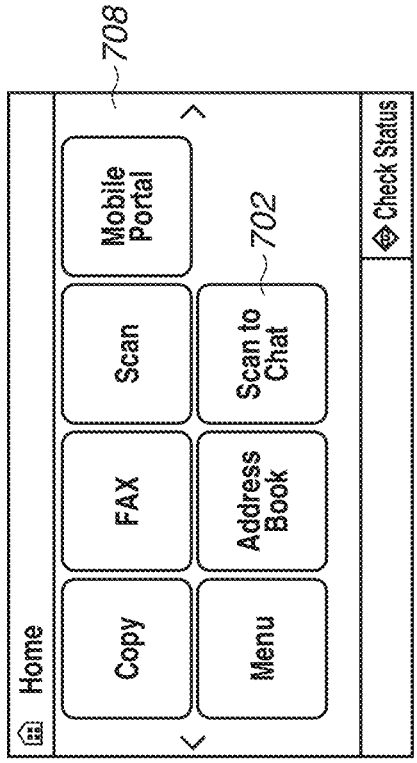
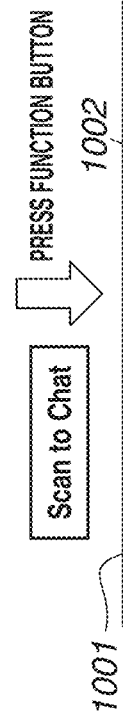
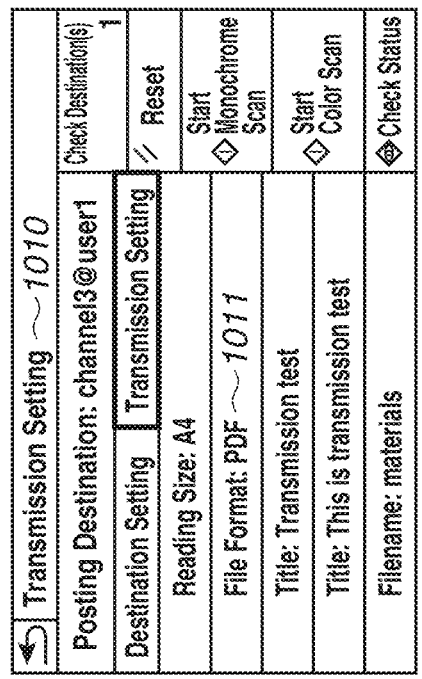
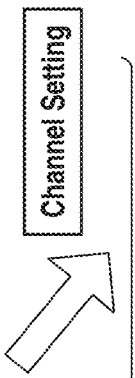
FIG.10B

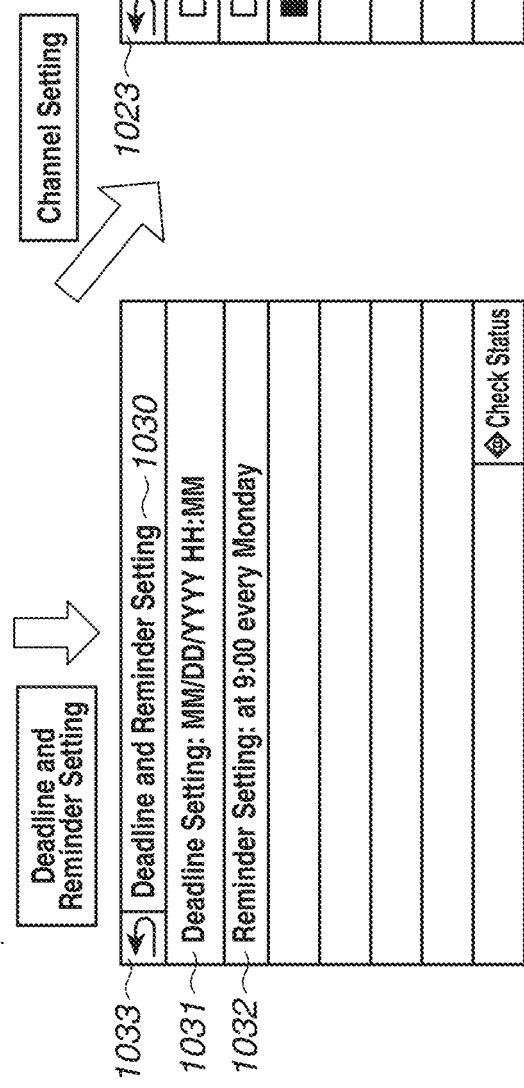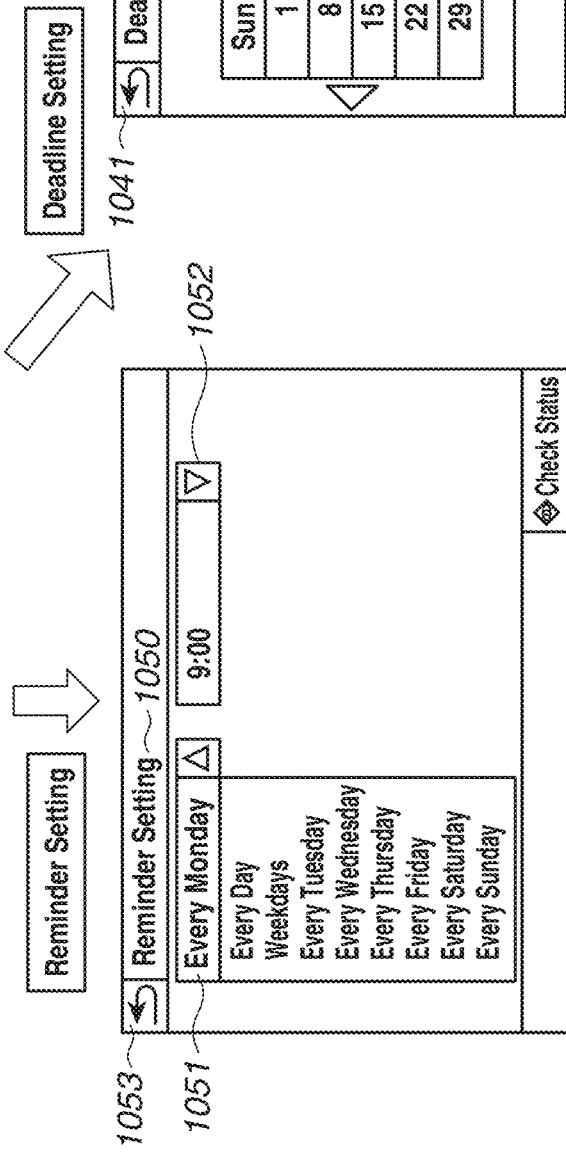
FIG.10A
FIG.10B

FIG.11

| Connection Destination | Token Information | Operation Button |
|---|---|---|
| B Department Chat | abcdefghijklmn | Edit  Generate |
| A Inc. Affiliate | opqrstuvwxyz | Edit  Generate |

Scan to Chat Setting Registration Screen

New Registration

IMAGE PROCESSING APPARATUS, IMAGE PROCESSING METHOD, AND STORAGE MEDIUM

BACKGROUND

Field

The present disclosure relates to an image processing apparatus, an image processing method, and a storage medium.

Description of the Related Art

Japanese Patent Application Laid-Open No. 2021-078084 discusses an image processing apparatus that transmits image data generated by scanning a document image to a chat server providing a chat service.

The image data is thereby uploaded to and shared in a talk room of the chat service.

In using the chat service, the sender of a message prompts the receiver to check the transmitted content by sending a reminder to the receiver as appropriate if the content is important.

According to Japanese Patent Application Laid-Open No. 2021-078084, the image processing apparatus can upload the image data generated by scanning the document image to the talk room but is not capable of generating reminder settings.

SUMMARY

The present disclosure is directed to facilitating settings for prompting a receiver to check content when an image processing apparatus transmits image data generated by reading scanning a document image to a chat service.

According to an aspect of the present disclosure, an image processing apparatus includes a scanning unit configured to scan an image of a document and generate image data, an acceptance unit configured to accept selection of a channel of a chat service, and a transmission unit configured to transmit information about the selected channel and the generated image data to a server configured to manage the chat service, wherein the acceptance unit is further configured to accept designation of reminder timing and a message, wherein the transmitted image data is posted to the selected channel based on the information about the channel, wherein the transmission unit is configured to transmit the message to the server based on the designated timing, and wherein the message is posted to the selected channel based on the information about the channel.

Further features of the present disclosure will become apparent from the following description of exemplary embodiments with reference to the attached drawings.

BRIEF DESCRIPTION OF THE DRAWINGS

FIGS. 10A and 10B are diagrams illustrating examples of screen transition during the scan to chat processing.

FIG. 11 is a diagram illustrating an example of a setting registration screen.

DESCRIPTION OF THE EMBODIMENTS

Exemplary embodiments of the present disclosure will be described below with reference to the drawings. Configurations described in the following exemplary embodiments are just examples, and the present disclosure is not limited to the illustrated configurations.

Figure 1:
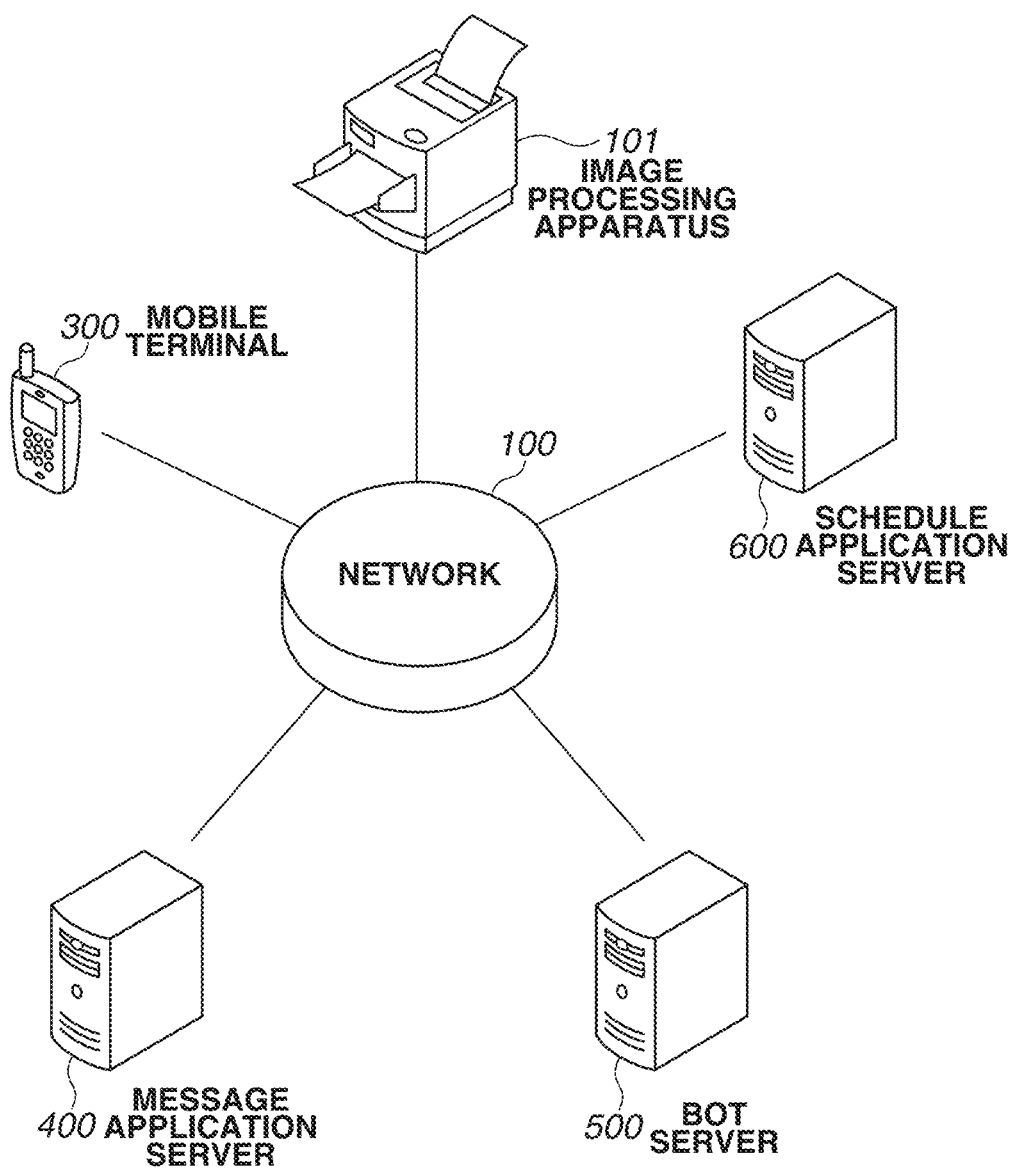
FIG. 1 is a diagram illustrating an example of a system configuration according to the present disclosure.

FIG. 1 is a diagram illustrating an example of a system configuration according to a first exemplary embodiment of the present disclosure. An image processing system according to the present exemplary embodiment includes a mobile terminal 300 that is an example of a terminal apparatus, an image processing apparatus (multifunction peripheral: MFP) 101 capable of communication via a network 100, and a message application server 400. The information processing apparatus may be a scanning apparatus. A bot server 500 and a schedule application server 600 are also connected and can communicate via the network 100. The message application server 400 is a chat server that manages a chat service for receiving messages and image data transmitted from the image processing apparatus 101 and the mobile terminal 300 and displaying the messages and the image data on the mobile terminal 300 and a not-illustrated personal computer (PC) based on user operations. The message application server 400 may include a plurality of server apparatuses. The bot server 500 links the image processing apparatus 101 with information (token information) corresponding to a bot application installed on the connected message application server 400, and transfers a request from the image processing apparatus 101 to the message application server 400. The schedule application server 600 is a server that manages schedule information transmitted from the image processing apparatus 101, the mobile terminal 300, and the message application server 400. The network 100 according to the present exemplary embodiment may be the Internet or a local area network (LAN). The network 100 may be a wired or wireless network.

Figure 2:
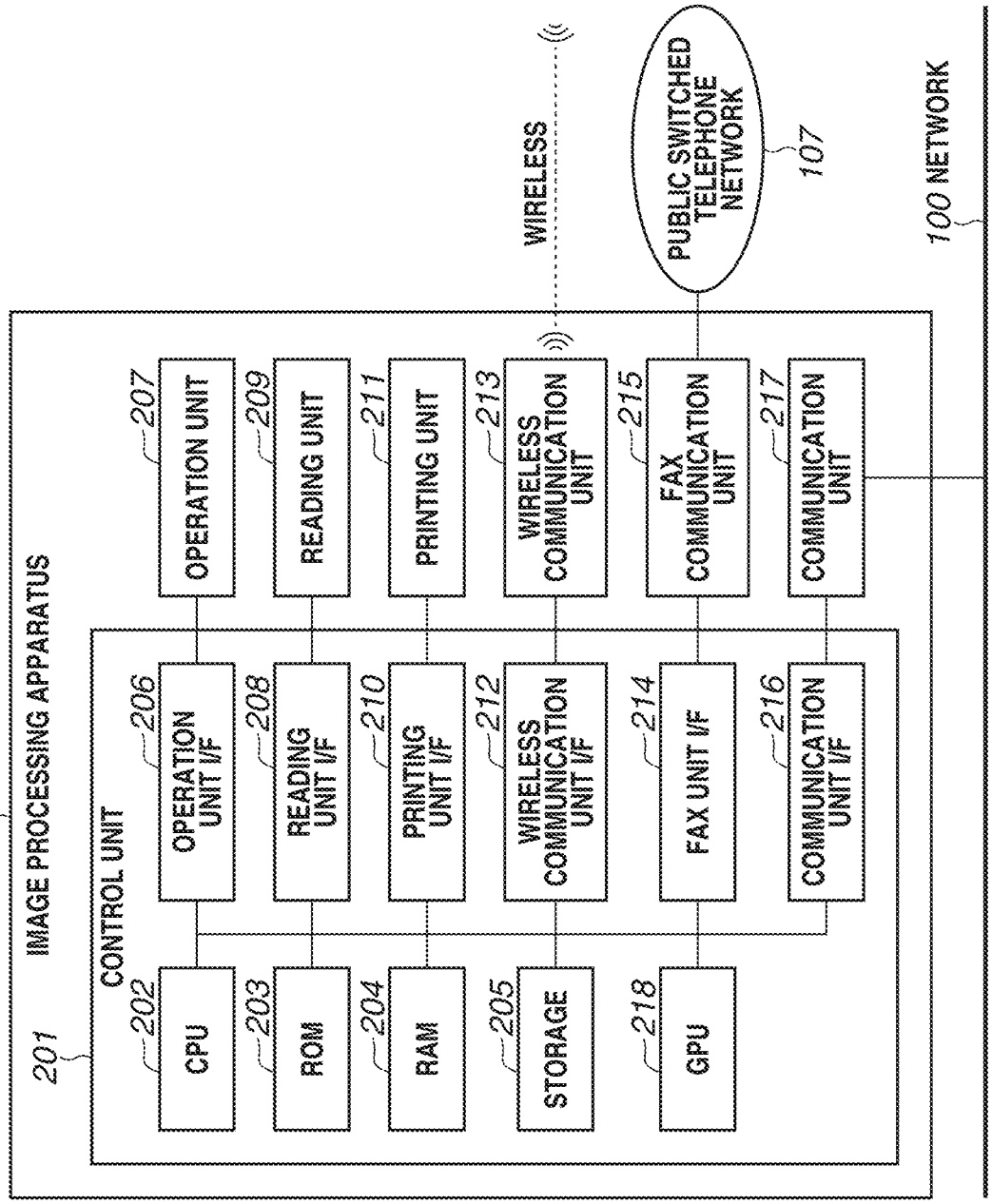
FIG. 2 is a diagram illustrating an example of a hardware configuration of an image processing apparatus.

FIG. 2 is a diagram illustrating an example of a hardware configuration of the image processing apparatus 101. The image processing apparatus 101 includes a central processing unit (CPU) 202, a read-only memory (ROM) 203, a random access memory (RAM) 204, a storage 205, an operation unit interface (I/F) 206, an operation unit 207, a reading unit I/F 208, a reading unit 209, a printing unit I/F 210, a printing unit 211, a wireless communication unit I/F 212, and a wireless communication unit 213. The image processing apparatus 101 also includes a facsimile (FAX) unit I/F 214, a FAX communication unit 215, a communication unit I/F 216, a communication unit 217, and a graphics processing unit (GPU) 218.

A control unit 201 including the CPU 202 controls the operation of the entire image processing apparatus 101. The CPU 202 reads a control program stored in the ROM 203 or the storage 205 into the RAM 204 and performs various types of control such as read control and print control. The ROM 203 stores control programs executable by the CPU 202. The ROM 203 also stores a boot program and font data. The RAM 204 is a main storage memory, and is used as a work area and a temporary storage area for loading various control programs stored in the ROM 203 and the storage 205. The storage 205 stores image data, print data, various programs, and various types of setting information. In the present exemplary embodiment, a flash memory is assumed as the storage 205. However, auxiliary storage devices such as a solid-state drive (SSD) and a hard disc drive (HDD) may be used. An embedded MultiMediaCard (eMMC) may be used.

The image processing apparatus 101 according to the present exemplary embodiment is configured so that one CPU 202 performs processes illustrated in a flowchart to be described below using one memory (RAM 204). However, this is not restrictive. For example, a plurality of CPUs, RAMs, ROMs, and storages may cooperate to perform the processes illustrated in the flowchart to be described below. Some of the processes may be performed by using a hardware circuit such as an application-specific integrated circuit (ASIC) and a field-programmable gate array (FPGA).

The operation unit I/F 206 connects the operation unit 207 and the control unit 201. The operation unit 207 includes a display unit such as a touchscreen, and hardware keys. The operation unit 207 displays information to the user and detects input from the user.

The reading unit I/F 208 connects the reading unit 209, such as a scanner, with the control unit 201. The reading unit 209 reads a document image, and the CPU 202 converts the image into image data such as binary data. The image data generated based on the image read by the reading unit 209 is transmitted to an external apparatus or printed on recording paper. The reading unit 209 is included in a scanning unit, and can scan a plurality of documents placed on a not-illustrated automatic document feeder (ADF) and generate a plurality of pieces of image data. In doing so, the documents placed on the ADF are conveyed by the ADF for scanning.

The printing unit I/F 210 connects the printing unit 211, such as a printer, with the control unit 201. The CPU 202 transfers image data (print data) stored in the RAM 204 to the printing unit 211 via the printing unit I/F 210. The printing unit 211 prints an image based on the transferred image data on recording paper fed from a feed cassette.

The wireless communication unit I/F 212 is an I/F for controlling the wireless communication unit 213, and wirelessly connects the control unit 201 with an external wireless device (herein, mobile terminal 300).

The control unit 201 controls the FAX communication unit 215 such as a FAX via the FAX unit I/F 214, and is thereby connected to a public switched telephone network 107. The FAX unit I/F 214 is an I/F for controlling the FAX communication unit 215. The FAX unit I/F 214 can connect to the public switched telephone network 107 and control a FAX communication protocol by controlling a FAX communication modem or a network control unit (NCU).

The communication unit I/F 216 connects the control unit 201 and the network 100. The communication unit I/F 216 controls the communication unit 217 to transmit image data and various types of internal information about the image processing apparatus 101 to an external apparatus on the network 100 and receive print data from an image processing apparatus on the network 100 and information on the network 100. As a transmission and reception method over the network 100, the communication unit 217 can perform transmission and reception using an email, as well as file transmission using other protocols (such as the File Transfer Protocol (FTP), Server Message Block (SMB), and Web Distributed Authoring and Versioning (WebDAV)). The communication unit 217 can also transmit and receive image data and various types of setting data over the network 100 through Hypertext Transfer Protocol (HTTP) communication access from the mobile terminal 300, the message application server 400, the bot server 500, and the schedule application server 600.

Figure 3:
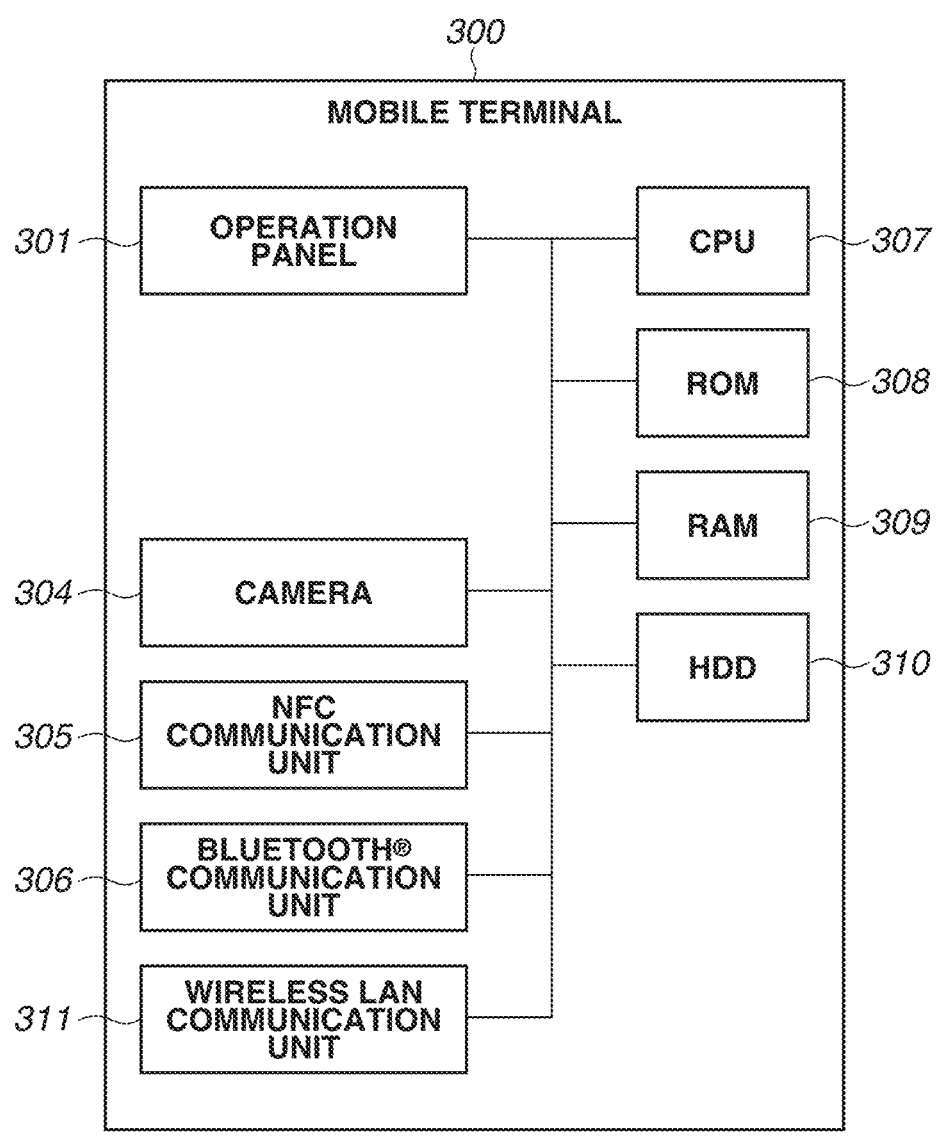
FIG. 3 is a diagram illustrating an example of a hardware configuration of a mobile terminal.

FIG. 3 is a diagram illustrating an example of a hardware configuration of the mobile terminal 300. While the mobile terminal 300 according to the present exemplary embodiment is assumed to be a device such as a smartphone and a tablet PC, other information processing apparatuses capable of Wireless Fidelity (Wi-Fi) communication may be used.

A CPU 307 reads a control program stored in a ROM 308 and performs various types of processing for controlling the operation of the mobile terminal 300. The ROM 308 stores the control program. The RAM 309 is used as a temporary storage area such as a main memory and a work area of the CPU 307. An HDD 310 stores various types of data including pictures and electronic documents.

An operation panel 301 has a touchscreen function capable of detecting touch operations performed by the user, and displays various screens provided by an operating system (OS) and an email transmission application. The operation panel 301 is also used to check information stored in the message application server 400 and the schedule application server 600. The user can input desired operation instructions to the mobile terminal 300 by making touch operations on the operation panel 301. The mobile terminal 300 includes not-illustrated hardware keys, and the user can input operation instructions to the mobile terminal 300 using the hardware keys.

A camera 304 captures an image in response to an imaging instruction given by the user. Pictures captured by the camera 304 are stored in a predetermined area of the HDD 310. A program capable of analyzing a Quick Response (QR) Code® can be used to obtain information from a QR code read by the camera 304.

The mobile terminal 300 can exchange data with various peripheral devices via a near-field communication (NFC) communication unit 305, a Bluetooth® communication unit 306, and a wireless LAN communication unit 311. The Bluetooth® communication unit 306 of the mobile terminal 300 may support Bluetooth® Low Energy.

Figure 4:
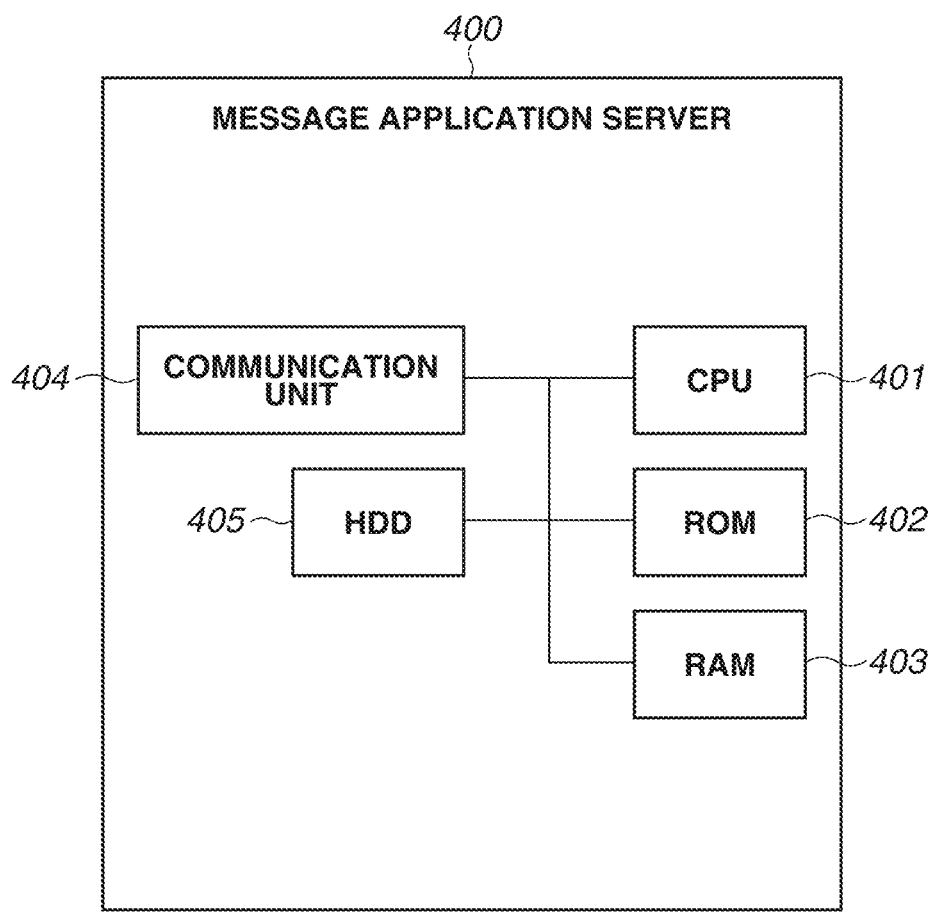
FIG. 4 is a diagram illustrating an example of a hardware configuration of a message application server.

FIG. 4 is a diagram illustrating an example of a hardware configuration of the message application server 400. A CPU 401 reads a control program stored in a ROM 402 and performs various types of processing for controlling the operation of the message application server 400. The ROM 402 stores the control program. A RAM 403 is used as a temporary storage area such as a main memory and a work area of the CPU 401. An HDD 405 stores various types of data such as messages, image data, and channel information. The message application server 400 can transmit and receive data to/from various devices such as the mobile terminal 300, the image processing apparatus 101, the bot server 500, and the schedule application server 600 via a communication unit 404. The communication unit 404 may perform wired communication using Ethernet® or wireless communication such as Wi-Fi communication.

Figure 5:
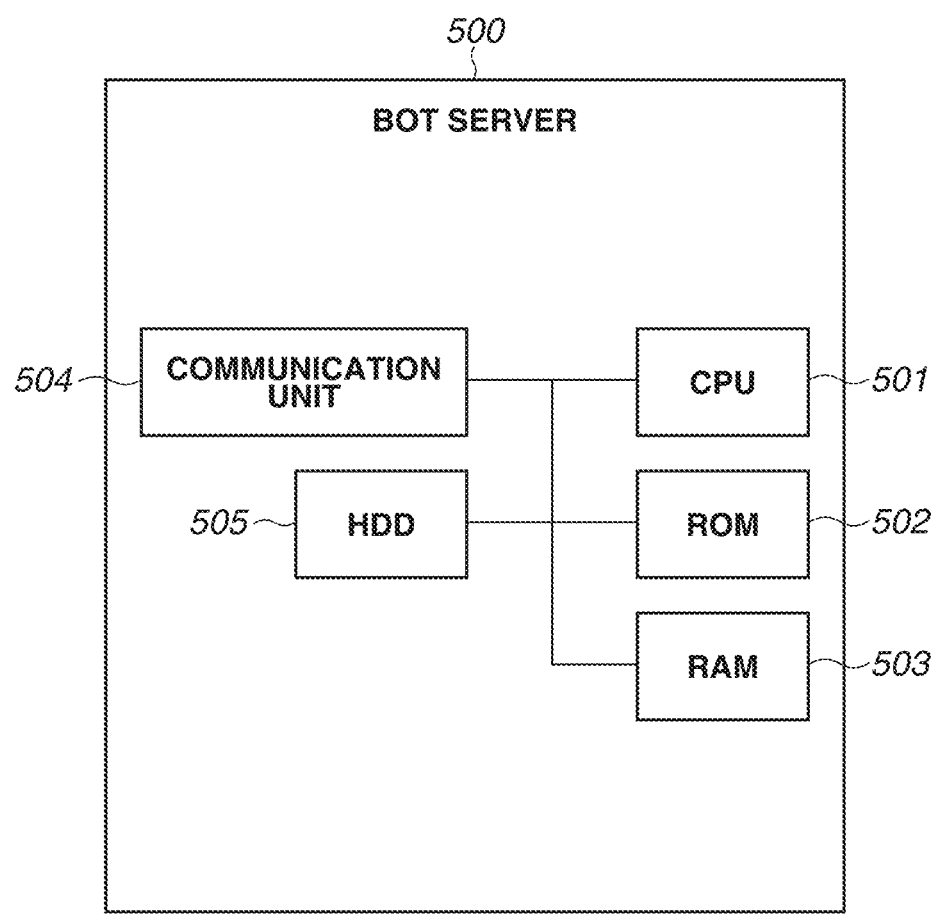
FIG. 5 is a diagram illustrating an example of a hardware configuration of a bot server.

FIG. 5 is a diagram illustrating an example of a hardware configuration of the bot server 500. A CPU 501 reads a control program stored in a ROM 502 and controls the operation of the bot server 500 to process requests from the image processing apparatus 101. The requests may include those made to the message application server 400 and those made to the bot server 500. The ROM 502 stores the control program. A RAM 503 is used as a temporary storage area such as a main memory and a work area of the CPU 501. An HDD 505 stores various types of data such as messages, image data, and channel information. The bot server 500 can transmit and receive data to/from various devices such as the mobile terminal 300, the image processing apparatus 101, and the message application server 400 via a communication unit 504.

Figure 6:
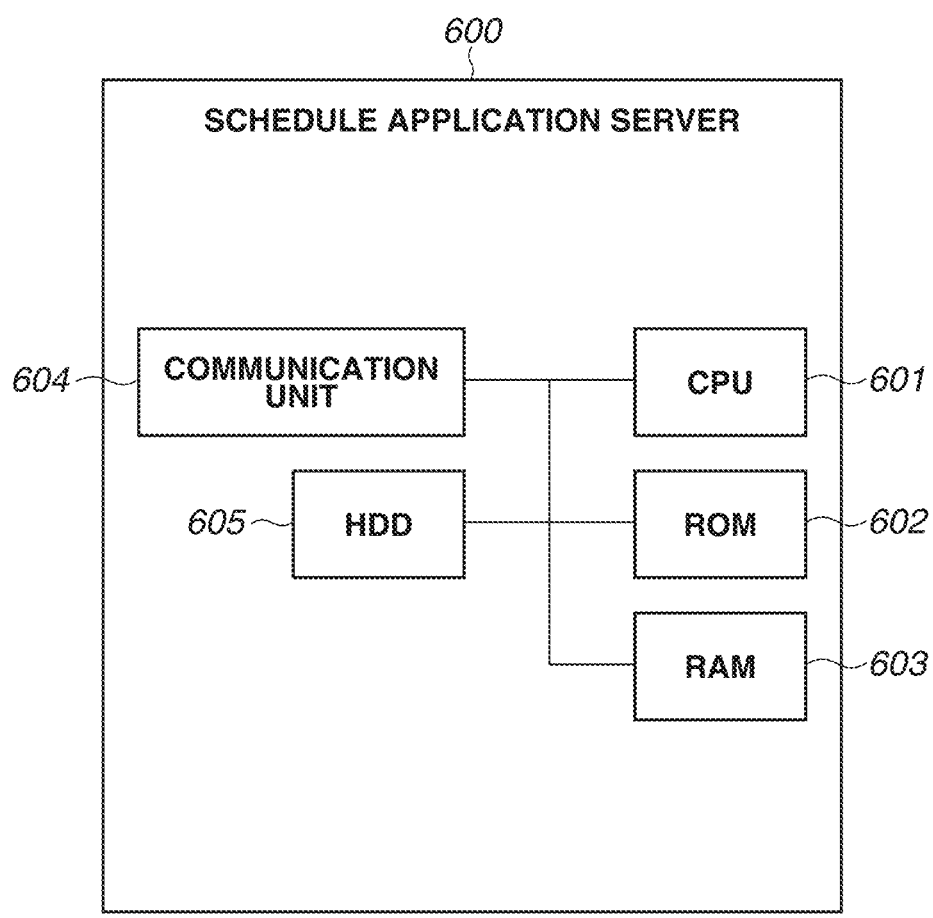
FIG. 6 is a diagram illustrating an example of a hardware configuration of a schedule application server.

FIG. 6 is a diagram illustrating an example of a hardware configuration of the schedule application server 600. A CPU 601 reads a control program stored in a ROM 602 into a RAM 603 and controls the operation of the schedule application server 600. The CPU 601 thereby processes requests made by the image processing apparatus 101, the mobile terminal 300, and the message application server 400 to the schedule application server 600. The ROM 602 stores the control program. The RAM 603 is used as a temporary storage area such as a main memory and a work area of the CPU 601. An HDD 605 stores schedule information about each user. The schedule application server 600 can transmit and receive data to/from various devices such as the image processing apparatus 101, the mobile terminal 300, and the message application server 400 via a communication unit 604. The schedule application server 600 may include a plurality of server apparatuses.

Figure 7:
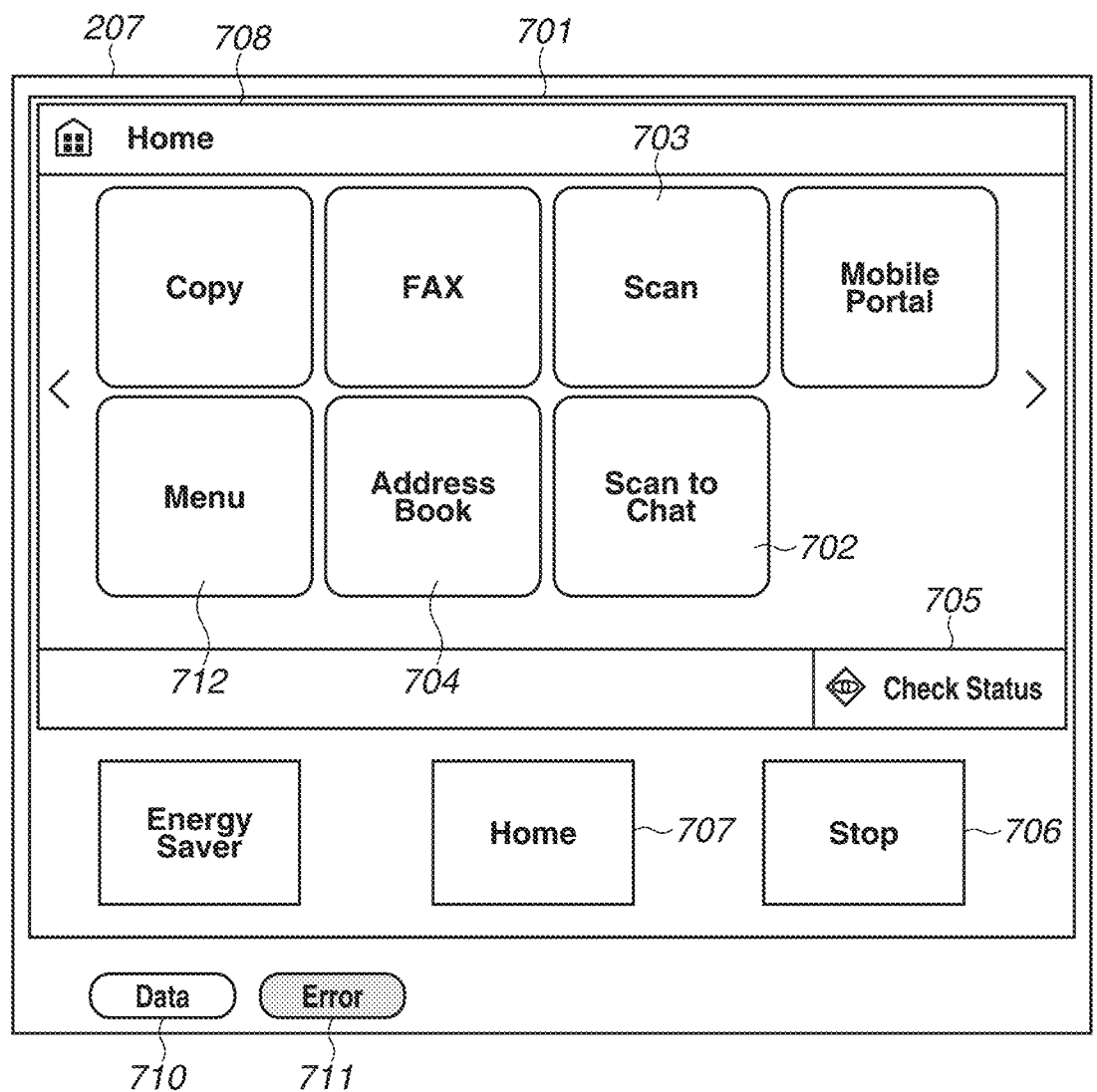
FIG. 7 is a diagram illustrating an example of a home screen displayed on an operation unit of the image processing apparatus.

FIG. 7 is a diagram illustrating an example of a home screen displayed on the operation unit 207 of the image processing apparatus 101. The operation unit 207 includes a touchscreen 701 that displays an operation screen, and light-emitting diodes (LEDs) 710 and 711. The touchscreen 701 is an instruction unit, and also functions as an acceptance unit for accepting instructions from the user and a display unit for displaying a screen. The user directly touches the screen displayed on the touchscreen 701 with a finger or an object such as a stylus, and gives instructions to perform various functions based on the displayed screen.

The touchscreen 701 illustrated in FIG. 7 is displaying a home screen 708. The home screen 708 is the initial screen for giving instructions to perform various functions of the image processing apparatus 101. The home screen 708 is a screen on which the user selects a screen display to make various settings for the respective functions to be performed by the image processing apparatus 101, such as copy, FAX, scan, and media print functions.

A check status button 705 is an object for displaying a screen for checking the states of the image processing apparatus 101 (status check screen). A transmission history and a job execution history can be displayed on the not-illustrated status check screen.

A scan to chat button 702 is an object for displaying a setting screen for scan to chat processing. If the scan to chat button 702 is selected by the user, a scan to chat screen 1001 in FIG. 10A is displayed on the operation unit 207. The scan to chat processing will be described in detail below with reference to FIGS. 8 and 9.

A scan button 703 is an object for displaying a scan selection screen (not illustrated) of the image processing apparatus 101. The scan selection screen is a screen for selecting transmission functions such as electronic mail transmission (email), SMB, FTP, and HTTP file transmission, and Internet FAX (I-FAX) transmission functions. Setting screens of the transmission functions are displayed by touching the displayed objects representing the respective transmission functions.

An address book button 704 is an object for displaying an address book screen of the image processing apparatus 101 when selected by the user. The LEDs 710 and 711 are to notify the user of the state of the image processing apparatus 101. The LED 710 is lit during reception of an email or a print job and during execution of a print job. The LED 711 is lit when an error occurs in the image processing apparatus 101. A stop button 706 is an object for cancelling various operations. The stop button 706 is an object constantly displayed on the operation unit 207. A home button 707 is an object for displaying the home screen 708. The home button 707 is an object constantly displayed on the operation unit 207. A menu button 712 is an object for displaying a screen for making configuration settings, such as a language setting, and various function settings.

Figure 8:
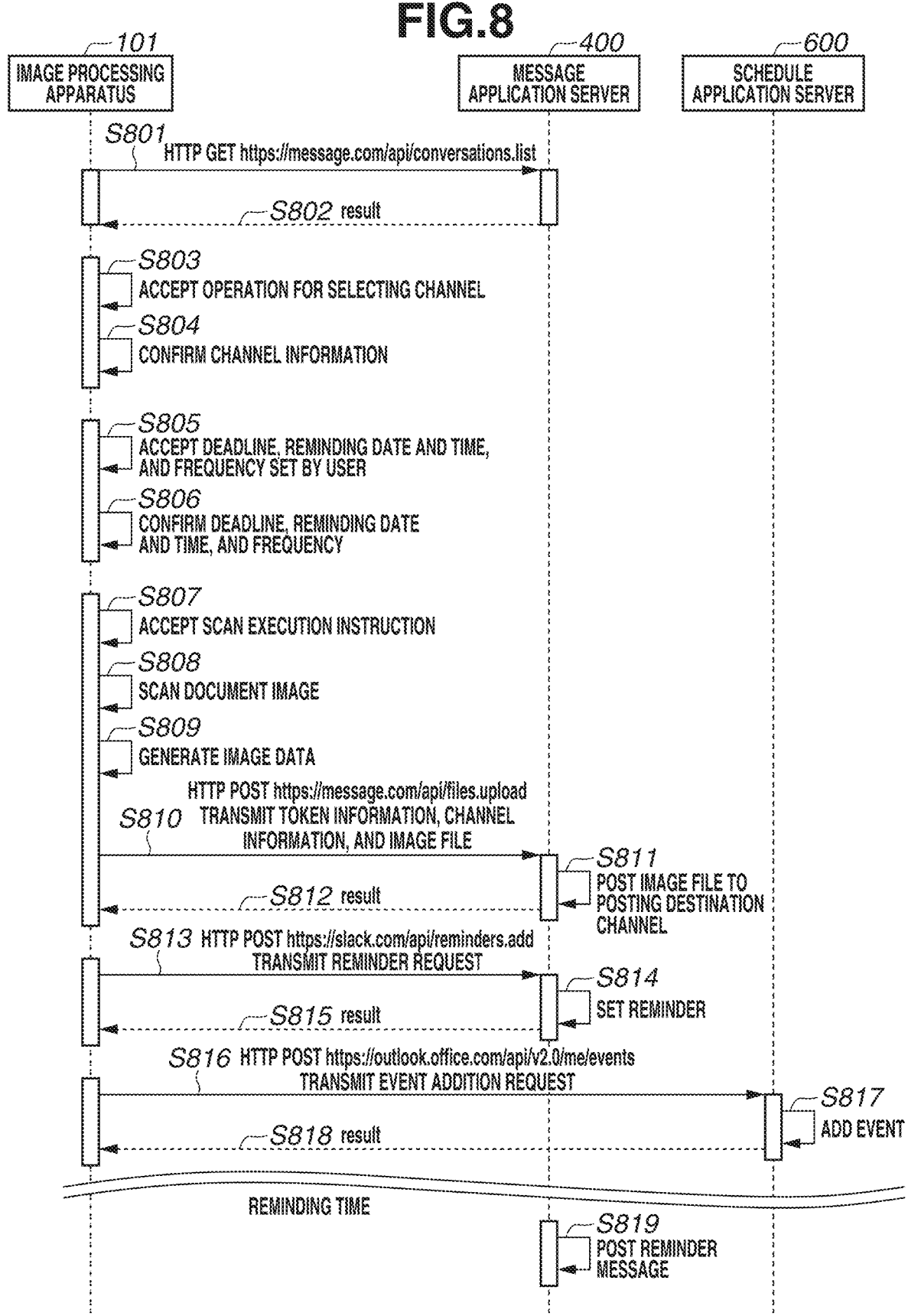
FIG. 8 is a diagram illustrating an example of a sequence where the image processing apparatus transmits a file generated by scanning to the message application server.

FIG. 8 is a diagram illustrating an example of a sequence where the image processing apparatus 101 transmits a file generated by scanning to the message application server 400. The sequence illustrated in FIG. 8 is started in response to selection of a channel setting button 1003 on the scan to chat screen 1001 in FIG. 10A.

In step S801, the CPU 202 of the image processing apparatus 101 controls the communication unit 217 to request channel information from the message application server 400 by HTTP communication. Specifically, the CPU 202 transmits token information input to the image processing apparatus 101 and information indicating a request for channel information about channels in a workspace indicated by the token information to the message application server 400. Here, user identifier (ID) information input to the image processing apparatus 101 is transmitted to the message application server 400 to identify information related to the user ID in the workspace.

If user information in the workspace is readable and writable by only the user himself/herself, password information corresponding to the user ID information input to the image processing apparatus 101 is transmitted to the message application server 400 to acquire the authority.

An example of the command to be transmitted here is "HTTP GET https://message.com/api/conversations.list". The Uniform Resource Locator (URL) included in this command, "https://message.com/api/conversations.list", is an URL for accessing the message application server 400. If token information is transmitted to this URL, the message application server 400 searches for a workspace corresponding to the token information and channels linked with the user. The token information is input by the user via a setting registration screen 1101 in FIG. 11 displayed on the operation unit 207 of the image processing apparatus 101.

While the acquisition of the channel information has been described above, the acquisition method is not limited thereto. For example, the image processing apparatus 101 may transmit authentication information such as a user ID and a password input via the operation unit 207 of the image processing apparatus 101 to the message application server 400, and receive information about the channels included in the workspace corresponding to the authentication information. Here, the message application server 400 identifies the workspace corresponding to the authentication information received from the image processing apparatus 101, and transmits the channel information about the channels included in (linked with) the workspace to the image processing apparatus 101.

As employed herein, a workspace refers to an organization or the like to which a plurality of users belongs in a message application, and can be called a team. There is a plurality of channels in a team, including normal channels and private channels. On a normal channel, all users participating in the workspace can upload chat conversations and data. On a private channel, only users invited to the channel or permitted to join the channel among the users included in the workspace can upload conversations and data. A channel is synonymous with a chat room in the workspace. As employed herein, a chat room is a mechanism for a plurality of users participating in the chat room to transmit and receive messages to/from each other and interact as if in a conversation. While, in the present exemplary embodiment, a channel is described as a chat room, this is not restrictive and a channel may be any mechanism where a plurality of users transmits and receives messages to/from each other and interact as if in a conversation. Other examples of a channel include a group chat, a room, a talk room, and a group.

As employed herein, a bot application refers to an application for registering the image processing apparatus 101 as a user in the message application and posting messages and image data. The bot application is installed on the message application server 400. If image data is transmitted to the message application server 400 with the bot application specified, the bot application posts the transmitted image data to the message application. The HDD 405 of the message application server 400 stores bot applications and tokens in association with each other. The bot applications are also associated with workspaces. Upon receipt of token information from the image processing apparatus 101, the message application server 400 can thus return information about the workspace associated with the bot application associated with the token information. Alternatively, the token information, the bot applications, and the workspaces may be directly associated with each other. In such a manner, a workspace corresponding to token information registered in advance (workspace where the user wants to transmit image data) can be selected from a large number of workspaces.

In step S802, the CPU 401 of the message application server 400 checks whether the access to the URL is authorized, based on the token information and the user ID received from the image processing apparatus 101 via the communication unit 404. If the access is authorized, the message application server 400 returns channel information about the channels included in the workspace corresponding to the token information to the image processing apparatus 101. The image processing apparatus 101 displays the received channel information on the operation unit 207.

In step S803, the CPU 202 of the image processing apparatus 101 accepts an operation for selecting the channel, to which image data is to be transmitted, from a list of channels displayed on the operation unit 207. In step S804, the user confirms the channel information. In addition to the channel information, a folder corresponding to the channel may be selected here. The user can create a plurality of folders in a channel managed by the message application server 400.

In step S805, the CPU 202 of the image processing apparatus 101 accepts a deadline, a reminder date and time, a frequency, and a reminder message set by the user. In step S806, the deadline, the reminder date and time, and the frequency are confirmed by user operations.

In step S807, the CPU 202 of the image processing apparatus 101 accepts a scan execution instruction via the operation unit 207.

In step S808, the CPU 202 of the image processing apparatus 101 scans a document image based on scan settings made by the user. Upon acceptance of a scan execution instruction, the image processing apparatus 101 can convey a plurality of documents placed on the not-illustrated ADF and generate image data on a plurality of pages.

In step S809, the CPU 202 of the image processing apparatus 101 generates image data on the scanned image(s) in a format set by the scan settings. The scan settings are specified by the user on a not-illustrated scan to chat detailed setting screen. The scan settings may be displayed and set along with transmission settings on a transmission setting screen 1010 in FIG. 10A to be described below.

In step S810, the CPU 202 of the image processing apparatus 101 transmits the same token information as that of step S801, the channel information about the posting destination channel selected in step S804, and the image file (image data) generated in step S809 to the message application server 400 via the communication unit 217 by HTTP communication. In other words, in step S810, the CPU 202 transmits a file posting request to the message application server 400. Alternatively, the request transmitted in step S810 may be a request to store the image data transmitted in step S810 into a folder corresponding to the specified channel, instead of a request to post the image data to the specified channel. In such a case, the image data is not displayed on the chat screen of the channel but stored in the folder corresponding to the channel. An example of the command to be transmitted here is "HTTP POST https://message.com/api/files.upload". The file format is specified by the user on the scan to chat transmission setting screen 1010. If a channel is selected on a channel selection screen and a folder included in the selected channel is selected, the request transmitted in step S810 may be a request to store the image data into the selected folder. In such a case, in step S810, the CPU 202 transmits the selected channel information and information about the selected folder (for example, folder ID) to the message application server 400.

The information about the posting destination channel, which is transmitted in step S810, is stored in the storage 205 of the image processing apparatus 101. The information may be stored at timing when the processing of step S810 starts or when the processing of step S810 ends. The information may be stored at timing when the settings are confirmed in step S804.

In step S811, the CPU 401 of the message application server 400 searches for workspace information registered with the token information received in step S810, and stores the received image file in association with the channel specified by the channel information. As a result, if the user activates the message application on the mobile terminal 300 and selects the posting destination channel, a screen to which the image file transmitted from the image processing apparatus 101 is posted appears.

In step S812, the CPU 401 of the message application server 400 transmits a result indicating whether the posting is successful to the image processing apparatus 101 as HTTP communication response information. If the posting fails, the CPU 202 of the image processing apparatus 101 may display a notification that the posting is failed on the operation unit 207. If the posting fails, the subsequent sequence is aborted.

In step S813, the CPU 202 of the image processing apparatus 101 transmits a reminder request including timing-related setting information, such as the date and time and the frequency, and the reminder message set in step S806 to the message application server 400 via the communication unit 217. An example of the command to be transmitted here is "HTTP POST https://message.com/api/reminders.add".

The reminder message transmitted here is the one input or selected by the user in step S806. This reminder message is assumed to be quoted from the message transmitted in step S810. As employed herein, quoting a message refers to a function of clarifying that the transmitted chat message is a response to a specific message in the conversations so far. Examples of quoting a message include including the posted comment of the specific message in the description of the message that the user transmits themselves, and transmitting the user's own message along with information from which the specific message can be identified (such as a permalink, ID, and time stamp). In the present exemplary embodiment, a method for including the posted comment transmitted in step S810 into the reminder message or a method for acquiring the permalink of the message posted in step S811 and describing the permalink may be used. An example of the command in the case where the image processing apparatus 101 acquires the permalink is "HTTP GET https://message.com/api/chat.getPermalink". Note that the original purpose of quoting the message is to identify which message the reminder message is responding to. A predetermined message or an input message accepted from the user may be simply transmitted instead.

In step S814, the CPU 401 of the message application server 400 sets a reminder based on the reminder request received in step S813.

In step S815, the CPU 401 of the message application server 400 transmits a result indicating whether the reminder setting is successful to the image processing apparatus 101 as HTTP communication response information. Like step S812, if the reminder setting is failed, the CPU 202 of the image processing apparatus 101 may display a notification that the reminder setting is failed on the operation unit 207.

In step S816, the CPU 202 of the image processing apparatus 101 transmits an event addition request including the information set in step S806, such as the date and time, the frequency, and the reminder message, to the schedule application server 600 via the communication unit 217. An example of the command to be transmitted here is "HTTP POST https://schedule.com/api/v2.0/me/events".

In step S817, the CPU 601 of the schedule application server 600 adds an event based on the event addition request received in step S817. With an event set on the schedule application server 600, a notification is transmitted to the event-registered user account when the event time, i.e., the timing set in step S806 comes. This event notification can be checked from a not-illustrated PC used by the user or the mobile terminal 300.

In step S818, the CPU 601 of the schedule application server 600 transmits a result indicating whether the addition of the event is successful to the image processing apparatus 101 as HTTP communication response information. Like S812, if the addition of the event is failed, the CPU 202 of the image processing apparatus 101 may display a notification that the addition of the event is failed on the operation unit 207. If the addition of the event is successful, the CPU 202 of the image processing apparatus 101 may display a notification that the sequence so far has been successful on the operation unit 207.

In step S819, the CPU 401 of the message application server 400 posts the reminder message when the reminder time comes. The channel to which the reminder message is posted is the channel indicated by the channel information transmitted as information included in the reminder request in step S813. The channel information transmitted in step S813 is the channel information transmitted as information included in the posting request in step S810. The reminder message can thus be automatically posted to the channel selected to post (store) the image data by the user. The posting destination of the reminder message may be freely set by the user. For example, a channel different from the channel selected as the posting destination of the image data on the channel selection screen may be selected, and the reminder message may be posted to the different channel. As another example, an individual user may be selected as the reminder destination instead of selecting the channel selected as the posting destination of the image on the channel selection screen, and the reminder message may be notified to the user.

While, in the present exemplary embodiment, a procedure for setting a reminder is described, the reminder can be cancelled as well. For example, the reminder may be cancelled by transmitting a command "HTTP POST https://message.com/api/reminders.delete". The message application may be activated on the mobile terminal 300 and directly operated to cancel the reminder. Those who are allowed to cancel a reminder are not limited to the sender or receiver of the message.

In the present exemplary embodiment, the description has been given of the example in which the image processing apparatus 101 transmits a reminder request to the message application server 400 or the schedule application server 600, and the message application server 400 or the schedule application server 600 transmits the reminder at specified timing. However, this is not restrictive. For example, the CPU 202 of the image processing apparatus 101 may check whether the timing set in step S813 has come, and transmit a reminder request to the message application server 400 based on the timing. The reminder request is a message posting request including the reminder message set in step S805 and the information about the channel selected as the posting destination of the image data in step S803. If the message posting request is transmitted to the message application server 400, the reminder message corresponding to the request is immediately posted to the channel indicated by the channel information. More specifically, based on the channel information included in the message posting request received from the image processing apparatus 101, the message application server 400 posts the reminder message to the channel indicated by the channel information. The channel information transmitted by the foregoing message posting request is the channel information stored in the storage 205 after the processing of step S810. The information about the channel selected as the posting destination of the image data can thus be used again and again, and the posting destination channel of the reminder message does not need to be separately selected.

If the image processing apparatus 101 transmits a message posting request for the reminder message to the message application server 400 when the set reminder timing comes, the message posting request includes a quotation request. To quote the post posted in response to the posting request for the image data transmitted in step S810, the quotation request includes the ID of the post (message) posted in step S810. The ID is acquired from the message application server 400 after the processing of step S810 and stored in the storage 205. In such a manner, the post of the image data posted in step S811 can be quoted in posting the reminder message.

Figure 9:
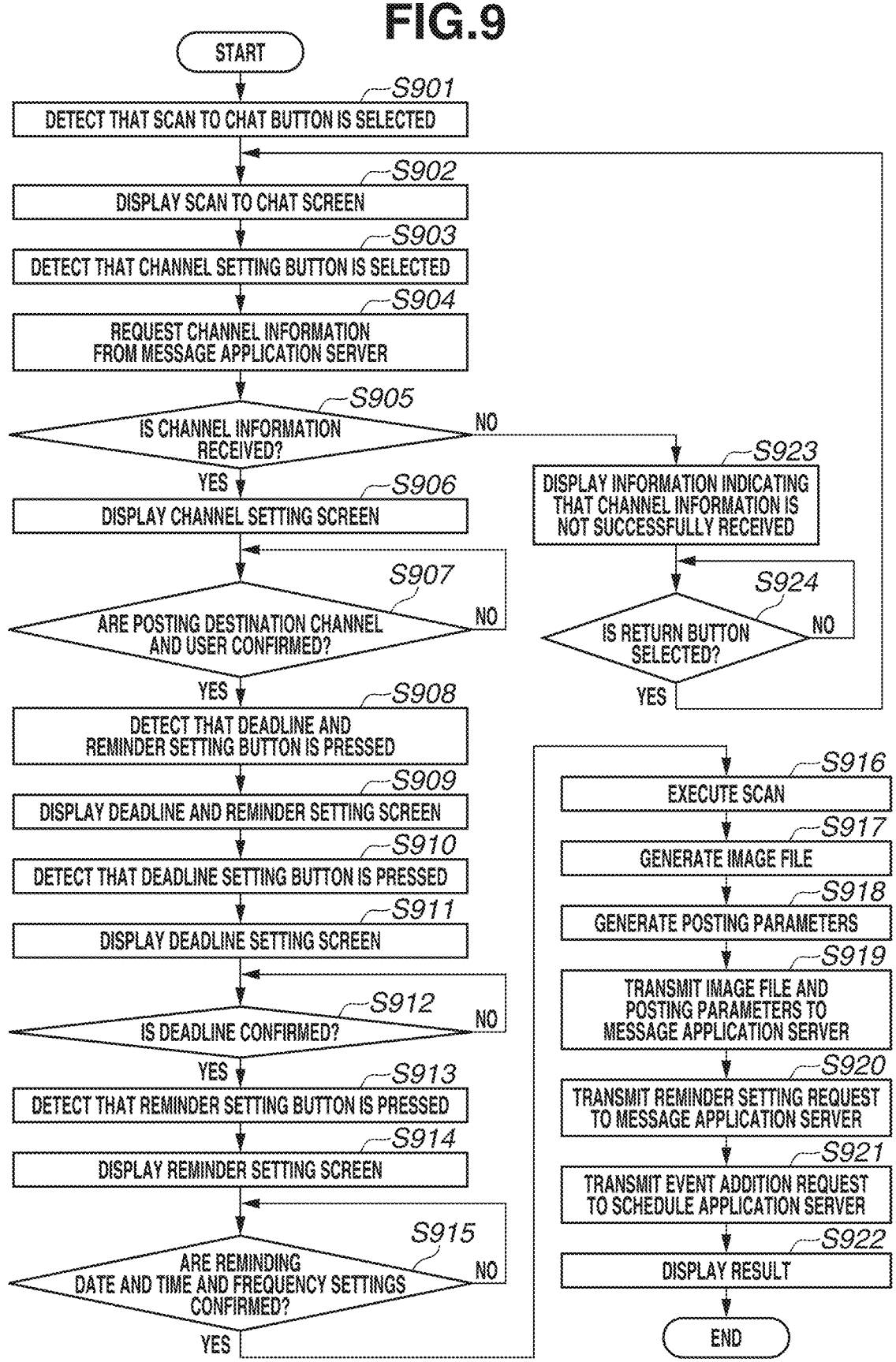
FIG. 9 is a flowchart illustrating an example of scan to chat processing performed by the image processing apparatus.

FIG. 9 is a flowchart illustrating an example of the scan to chat processing performed by the image processing apparatus 101. The processing of the flowchart in FIG. 9 is performed by the CPU 202 reading a program stored in the ROM 203 into the RAM 204 and executing the program. The procedure in FIG. 9 is started when the image processing apparatus 101 is powered on.

In step S901, the CPU 202 detects that the scan to chat button 702 is selected. The processing proceeds to step S902.

In step S902, the CPU 202 displays the scan to chat screen 1001 on the touchscreen 701 of the operation unit 207.

The screen transition when the scan to chat button 702 is selected will now be described with reference to FIGS. 10A and 10B.

FIGS. 10A and 10B are diagrams illustrating examples of screen transition during the scan to chat processing. If the scan to chat button 702 displayed on the home screen 708 is selected, the scan to chat screen 1001 is displayed on the touchscreen 701 of the operation unit 207.

If a transmission setting button 1002 is selected on the scan to chat screen 1001, the transmission setting screen 1010 is displayed. Transmission settings such as a file format 1011 can be changed and checked on this screen.

If the channel setting button 1003 is selected, a channel setting screen 1020 is displayed. The channel setting screen 1020 displays channels based on the channel information that the image processing apparatus 101 receives from the message application server 400. Channel buttons 1021 corresponding to the respective channels indicated by the received channel information are displayed on this screen. If a channel button 1021 is selected, user buttons 1022 for selecting the users included in the channel are displayed. Alternatively, if a channel button 1021 is selected, a list of folders corresponding to the channel may be displayed so that the upload destination folder of image data can be selected. Alternatively, if a channel button 1021 is selected, a request to upload image data generated by scanning to a folder corresponding to the channel may be transmitted instead of posting the image data to the channel. In such a case, the request that the image processing apparatus 101 transmits to the message application server 400 includes information such as the channel information about the selected channel, the image data, and the message.

If a return button 1023 is selected, the channel selection is stored and the scan to chat screen 1001 is displayed on the operation unit 207.

If a deadline and reminder setting button 1004 is selected, a deadline and reminder setting screen 1030 is displayed.

If a deadline setting button 1031 on the deadline and reminder setting screen 1030 is selected, a calendar for selecting a deadline is displayed like a deadline setting screen 1040. The calendar displayed here may be acquired from an internal scheduler of the image processing apparatus 101. The CPU 202 may communicate with the schedule application server 600 to acquire calendar information and display the calendar. In the present exemplary embodiment, the calendar is illustrated to be displayed on the operation unit 207 of the image processing apparatus 101. However, any screen may be displayed as long as the deadline can be set. If the user selects a date on the deadline setting screen 1040, the date is set as the deadline date.

If a return button 1041 is selected with the deadline set, the setting is stored and the deadline and reminder setting screen 1030 is displayed again. Here, the set deadline "Deadline Setting: MM/DD/YYYY HH:MM" is displayed on the deadline setting button 1031.

If a reminder setting button 1032 is selected, a reminder setting screen 1050 is displayed. On the reminder setting screen 1050, a frequency like every day and every Monday can be selected by using a pull-down menu 1051. Moreover, the time to transmit the reminder message can be specified by using a pull-down menu 1052. In the present exemplary embodiment, the reminder frequency is described to be set by using the pull-down menus 1051 and 1052. However, timing such as "hour later" and "two days later" may be set. A specific timing such as "Jan. 30, 2022, 9:00 a.m." may be set. The reminder setting screen 1050 may be configured so that the user can input a reminder message. In other words, the operation unit 207 accepts input of a reminder message from the user. Alternatively, the storage 205 of the image processing apparatus 101 may store a plurality of template messages in advance, and the operation unit 207 may accept selection of a message from the stored messages. Alternatively, the user may register template messages in advance. The registered template messages are stored in the storage 205.

In the present exemplary embodiment, the user to be reminded and the channel to be reminded are the same as those displayed on the channel button 1021 and the user button 1022 selected on the channel setting screen 1020. Alternatively, another screen for setting which user and which channel are to be reminded may be provided to make the transmission target of the message and the target of the reminder different.

If a return button 1053 is selected with the reminder frequency set, the reminder frequency is stored and the deadline and reminder setting screen 1030 is displayed again. Here, "Reminder Setting: at 9:00 Every Monday" is displayed on the reminder setting button 1032.

If a reset button 1005 is selected on the scan to chat screen 1001, the set information is cleared. Here, the settings of the channel information and the deadline and reminder information are also cleared.

If a monochrome start button 1006 or a color start button 1007 is selected on the scan to chat screen 1001, scan and transmit processing is started.

Return to the description of the procedure in FIG. 9. In step S903, the CPU 202 detects that the channel setting button 1003 is selected. In step S904, the CPU 202 requests channel information from the message application server 400 by HTTP communication, using token information registered in a token information 1103 (see FIG. 11) in advance and the user ID.

The setting registration screen 1101 in FIG. 11 will now be described. FIG. 11 is a diagram illustrating an example of the setting registration screen according to the present exemplary embodiment. The setting registration screen 1101 is a screen displayed on the operation unit 207 of the image processing apparatus 101. The setting registration screen 1101 may be displayed as a webpage on an operation unit of an information processing apparatus, such as a PC, connected to the image processing apparatus 101 via a network. The contents registered via the setting registration screen 1101 are stored in the storage 205.

A connection destination 1102 is a column indicating organization information about connection destinations. The token information 1103 is a column indicating registered token information. An operation button 1104 is an operation button column. This field displays edit buttons 1105 and generation buttons 1106.

If an edit button 1105 is selected, the user is allowed to input and modify the character strings of token information and connection destination information using a keyboard. If a generation button 1106 is selected, the scan to chat button 702 is set to be displayed on the home screen 708.

If a new registration button 1107 is selected, a new connection destination and new token information can be registered by accepting character strings input by the user.

Return to the description of the procedure in FIG. 9. In step S905, the CPU 202 determines whether channel information is received from the message application server 400 in response to the request for channel information transmitted in step S904. Specifically, if a status code included in the HTTP communication response indicates an error or if a parameter indicating an information acquisition failure is included in the body information of the response, the CPU 202 determines that channel information is not received.

If channel information is determined to be received (YES in step S905), the processing proceeds to step S906. If channel information is determined to be not received (NO in step S905), the processing proceeds to step S923.

In step S923, the CPU 202 displays information indicating that channel information is not successfully received on the channel setting screen 1020. Here, the channel setting screen 1020 does not display channel options.

In step S924, the CPU 202 determines whether the return button 1023 is selected. If the return button 1023 is determined to be selected (YES in step S924), the processing returns to step S902. If the return button 1023 is determined to be not selected (NO in step S924), the processing returns to step S924.

In step S906, the CPU 202 displays the channel setting screen 1020 displaying the channel information received from the message application server 400 on the touchscreen 701 of the operation unit 207.

In step S907, the CPU 202 detects whether the channel setting screen 1020 is operated and the channel and the user are confirmed via the touchscreen 701 of the operation unit 207.

If the channel and the user are confirmed (YES in step S907), the processing proceeds to step S908. If not (NO in step S907), the processing returns to step S907.

In step S908, the CPU 202 detects that the deadline and reminder setting button 1004 is pressed. In step S909, the CPU 202 displays the deadline and reminder setting screen 1030.

In step S910, the CPU 202 detects that the deadline setting button 1031 is pressed. In step S911, the CPU 202 displays the deadline setting screen 1040 on the operation unit 207.

In step S912, the CPU 202 detects whether the deadline is confirmed by operating the deadline setting screen 1040 and pressing the return button 1041 via the touchscreen 701 of the operation unit 207. If the deadline is confirmed (YES in step S912), the processing proceeds to step S913. If not (NO in step S912), the processing returns to step S912.

In step S913, the CPU 202 detects that the reminder setting button 1032 is pressed. In step S914, the CPU 202 displays the reminder setting screen 1050.

In step S915, the CPU 202 determines whether the reminder date and time and frequency settings are confirmed by operating the reminder setting screen 1050 and pressing the return button 1053 via the touchscreen 701 of the operation unit 207. If the reminder date and time and frequency settings are confirmed (YES in step S915), the processing proceeds to step S916. If not (NO in step S915), the processing returns to step S915.

In step S916, if the monochrome start button 1006 or the color start button 1007 displayed on the operation unit 207 is selected, the CPU 202 controls the reading unit 209 based on scan settings to read a document image and generate image data. The scan settings are specified by the user on the not-illustrated scan to chat detailed setting screen.

In step S917, the CPU 202 converts the image data generated in step S916 into the file format 1011 set on the transmission setting screen 1010. This processing may be omitted.

In step S918, the CPU 202 generates posting parameters. The posting parameters include a posting destination channel, an intended user, a file format, a filename, and a posting comment. For the file format, the file format corresponding to the file format 1011 set on the transmission setting screen 1010 is set. The posting comment may be a predetermined message or an input message accepted from the user. The filename set on the transmission setting screen 1010 is set as the filename.

In step S919, the CPU 202 transmits the image file generated in step S917 and the posting parameters generated in step S918 to the message application server 400 by the HTTP communication POST method, using the token information registered in advance. If such pieces of data (the file into which the image data is converted and the posting parameters) are transmitted to the message application server 400, the message application server 400 posts the file to the specified channel based on the received posting parameters. The posting of the image file and the addition of information are performed by the message application server 400.

In step S920, the CPU 202 transmits a reminder setting request to set a reminder with the date and time and the frequency set in step S915 to the message application server 400 by the HTTP communication POST method. The message application server 400 sets a reminder based on the received reminder setting request. The message application server 400 transmits a reminder message when the set reminder time comes.

In step S921, the CPU 202 transmits an event addition request to add an event with the deadline set in step S912 to the schedule application server 600 by the HTTP communication POST method. The schedule application server 600 sets an event based on the received event addition request. The schedule application server 600 issues a notification when the event time, i.e., the set deadline, comes.

In step S922, the CPU 202 displays the result of the processing so far on the touchscreen 701 of the operation unit 207.

In such a manner, the user can post the image file to a specific channel on the message application server 400 from the image processing apparatus 101, set a reminder, and set a deadline to the schedule application server 600.

Figure 12:
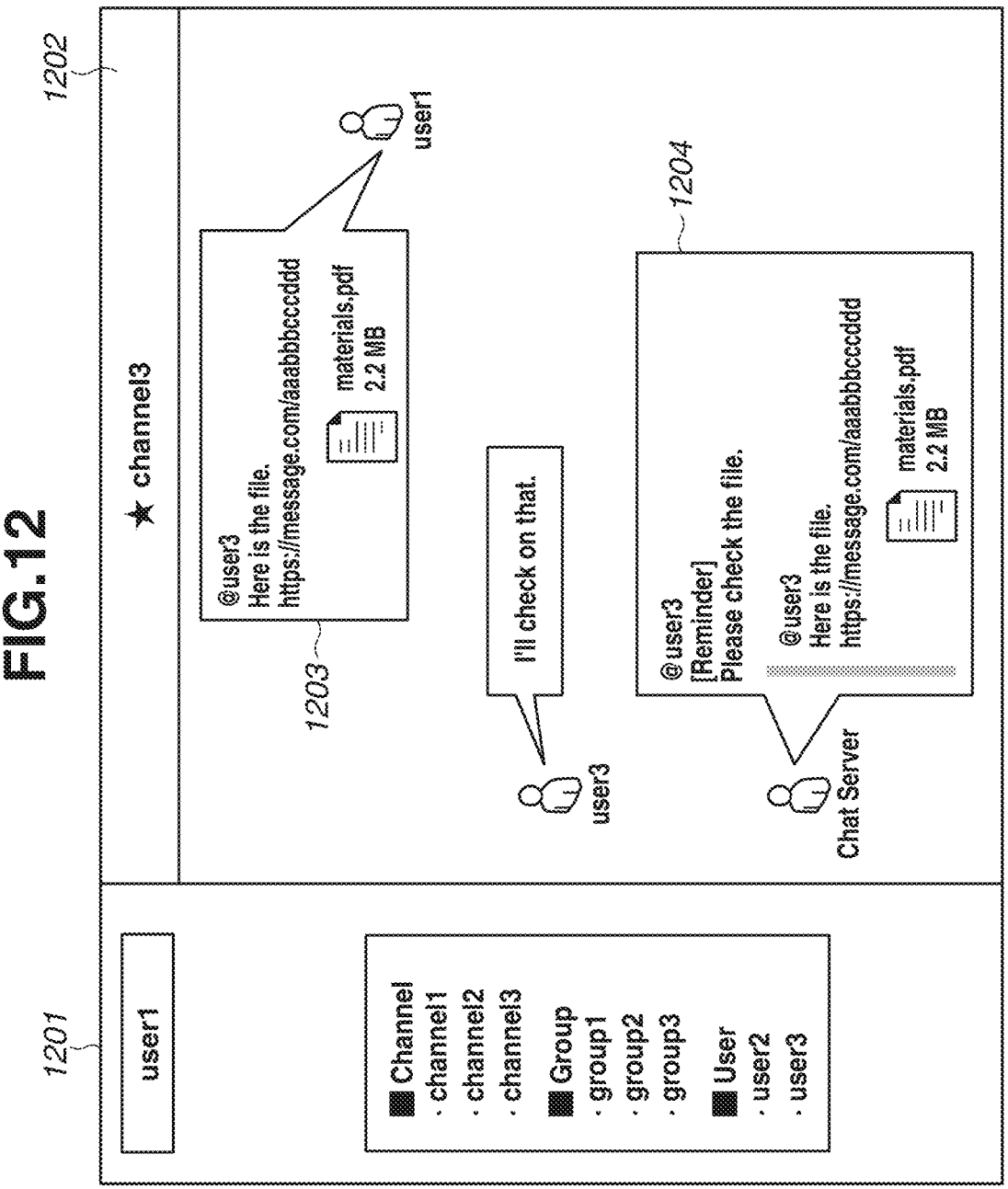
FIG. 12 is a diagram illustrating an example of a message screen of a message application.

FIG. 12 is a diagram illustrating an example of a message screen of the message application. A message screen 1201 in FIG. 12 is displayed when the reminder time comes after the message application is activated on the mobile terminal 300 and the series of processes in FIG. 9 is performed by the image processing apparatus 101. Here, the mobile terminal 300 is communicating with the message application server 400.

If the user activates the message application on the mobile terminal 300 and logs in to the message application by inputting the ID and password of the user's account, a screen dedicated to the user is displayed.

A message 1203 is a chat message posted by the user having the account "user1" to channel3. In the present exemplary embodiment, the message 1203 is displayed (posted) when the user having the account "user1" transmits an image file generated by scanning and the posting parameters to the message application server 400 using the user ID information about user1. In the example illustrated in FIG. 12, the posting parameters specify "channel3" as the posting channel, "user3" as a mentioned user, "materials.pdf" as the filename, and "Here is the file." as the posting comment.

A message 1204 is a reminder message posted by the message application server 400 when the set reminder time has come. The message 1204 is transmitted with the message 1203 quoted. The mentioned user set in transmitting the message 1203 is again set to be mentioned in the message 1204. In other words, the reminder message is posted with the same user as the posting destination (mentioned) user set on the operation unit 207 mentioned in the reminder message. In the example illustrated in FIG. 12, "user3" is mentioned again.

In the present exemplary embodiment, the reminder message is posted by the message application server 400.

In the present exemplary embodiment, when posting the message 1204, the message application server 400 may use the user account used in posting the message 1203. If the image processing apparatus 101 transmits a posting request to post the message 1204 when the timing set by the reminder setting comes, the message 1204 is posted using the user account indicated by the user information included in the posting request.

By performing the foregoing processing, the settings for prompting the receiver to check the content can be easily set when the image processing apparatus 101 transmits image data generated by reading a document image to the chat service.

In the first exemplary embodiment, the image processing apparatus 101 is described to directly transmit the image file and the posting parameters to the message application server 400 and set the reminder to the message application server 400. A second exemplary embodiment will be described using an example where an image processing apparatus 101 transmits an image file and posting parameters to a message application server 400 via a bot server 500, and the bot server 500 transmits a reminder. A detailed description of components and items denoted by the same reference numerals as used in the description of the first exemplary embodiment will be omitted.

Figure 13:
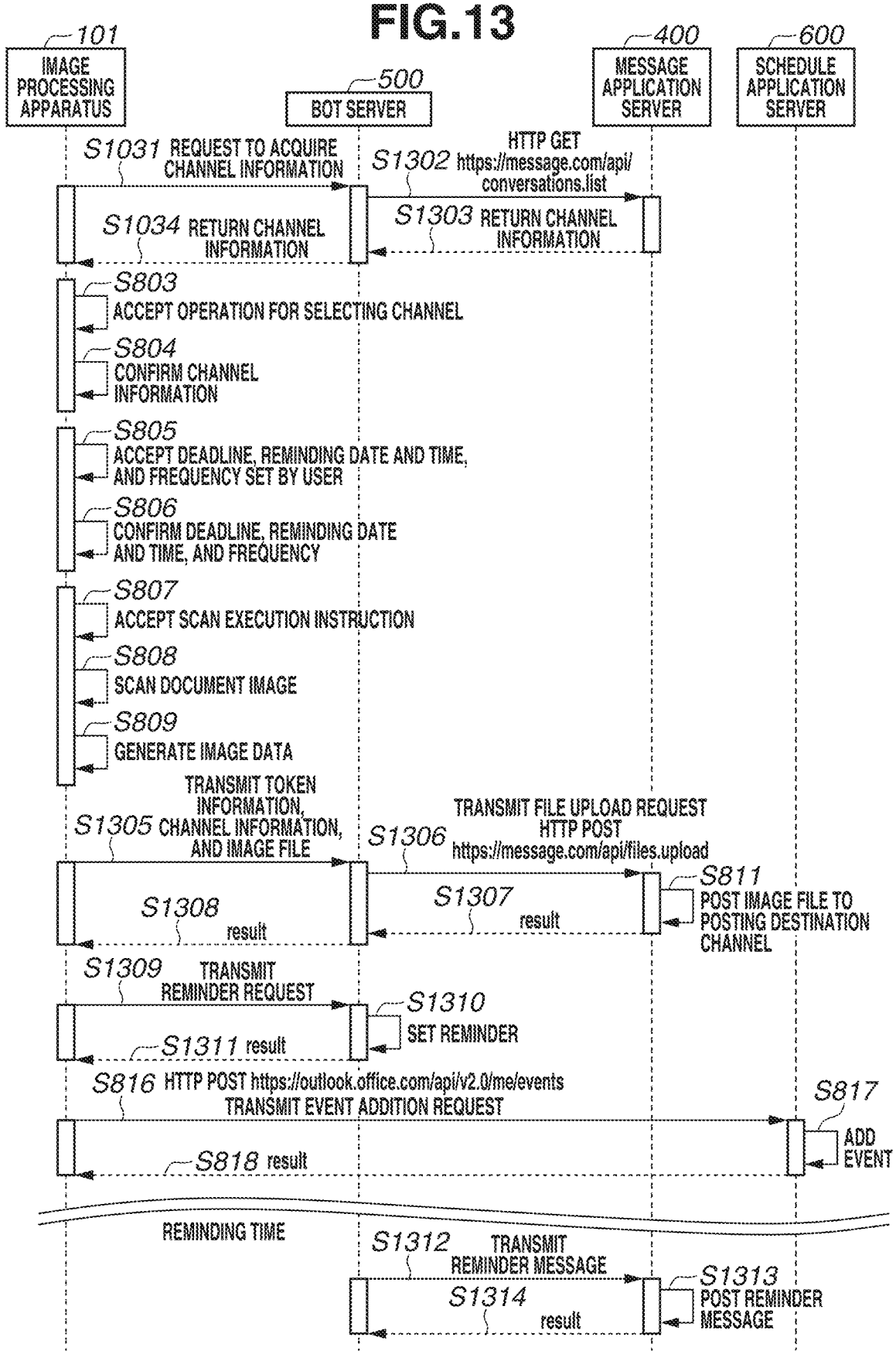
FIG. 13 is a diagram illustrating an example of a sequence where an image processing apparatus transmits a file generated by scanning to a message application server via a bot server.

FIG. 13 is a diagram illustrating an example of a sequence where the image processing apparatus 101 transmits a file generated by scanning to the message application server 400 via the bot server 500.

In step S1301, a CPU 202 of the image processing apparatus 101 requests the bot server 500 to acquire channel information.

In step S1302, a CPU 501 of the bot server 500 requests channel information from the message application server 400 by HTTP communication. An example of the command to be transmitted here is "HTTP GET https://message.com/api/conversations.list". If token information is transmitted to this URL, the message application server 400 searches for a workspace corresponding to the token information and channels linked with the user.

In step S1303, a CPU 401 of the message application server 400 checks whether the access to the URL is authorized, based on the received token information and user ID. If the access is authorized, the CPU 401 returns channel information about the channels included in the workspace corresponding to the token information to the bot server 500.

In step S1304, the CPU 501 of the bot server 500 returns the channel information received from the message application server 400 to the image processing apparatus 101.

The processes of steps S803 to S809 and S811 are the same as those described in the first exemplary embodiment.

In step S1305, the CPU 202 of the image processing apparatus 101 transmits the same token information as in step S1301, the information about the posting destination channel selected in step S804, and the image file (image data) generated in step S809 to the bot server 500 via a communication unit 217. A file format 1011 specified by the user on a scan to chat transmission setting screen 1010 is used as the file format.

In step S1306, the CPU 501 of the bot server 500 transmits a file upload request to the message application server 400 by HTTP communication. An example of the command to be transmitted here is "HTTP POST https://message.com/api/files.upload".

In step S1307, the CPU 401 of the message application server 400 returns a result indicating whether the posting is successful to the bot server 500 as HTTP communication response information.

In step S1308, the CPU 501 of the bot server 500 returns the result of the file posting received from the message application server 400 to the image processing apparatus 101. If the posting is failed, the CPU 202 of the image processing apparatus 101 may display a notification that the posting is failed on an operation unit 207.

In step S1309, the CPU 202 of the image processing apparatus 101 transmits a reminder setting request to set a reminder with the date and time and frequency confirmed in step S806 to the bot server 500 via the communication unit 217.

Here, information about the channel and user to be reminded is set as well.

In step S1310, the CPU 501 of the bot server 500 sets a reminder based on the reminder setting request received in step S1309.

In step S1311, the CPU 501 of the bot server 500 transmits a result indicating whether the reminder setting is successful to the image processing apparatus 101.

The processes of steps S816 to S818 are the same as those described in the first exemplary embodiment.

In step S1312, the CPU 501 of the bot server 500 transmits a reminder message to the message application server 400 when the reminder time has come. An example of the command to be transmitted here is "HTTP POST https://message.com/api/chat.postMessage".

In step S1313, the CPU 401 of the message application server 400 posts the reminder message received in step S1312 to the specified channel and user.

In step S1314, the CPU 401 of the message application server 400 transmits a result indicating whether the posting is successful to the bot server 500.

In the second exemplary embodiment, the login user ID or device ID is used for the communication with the bot server 500. However, any other uniquely determined ID, such as a tenant ID, can be used as well.

Figure 14:
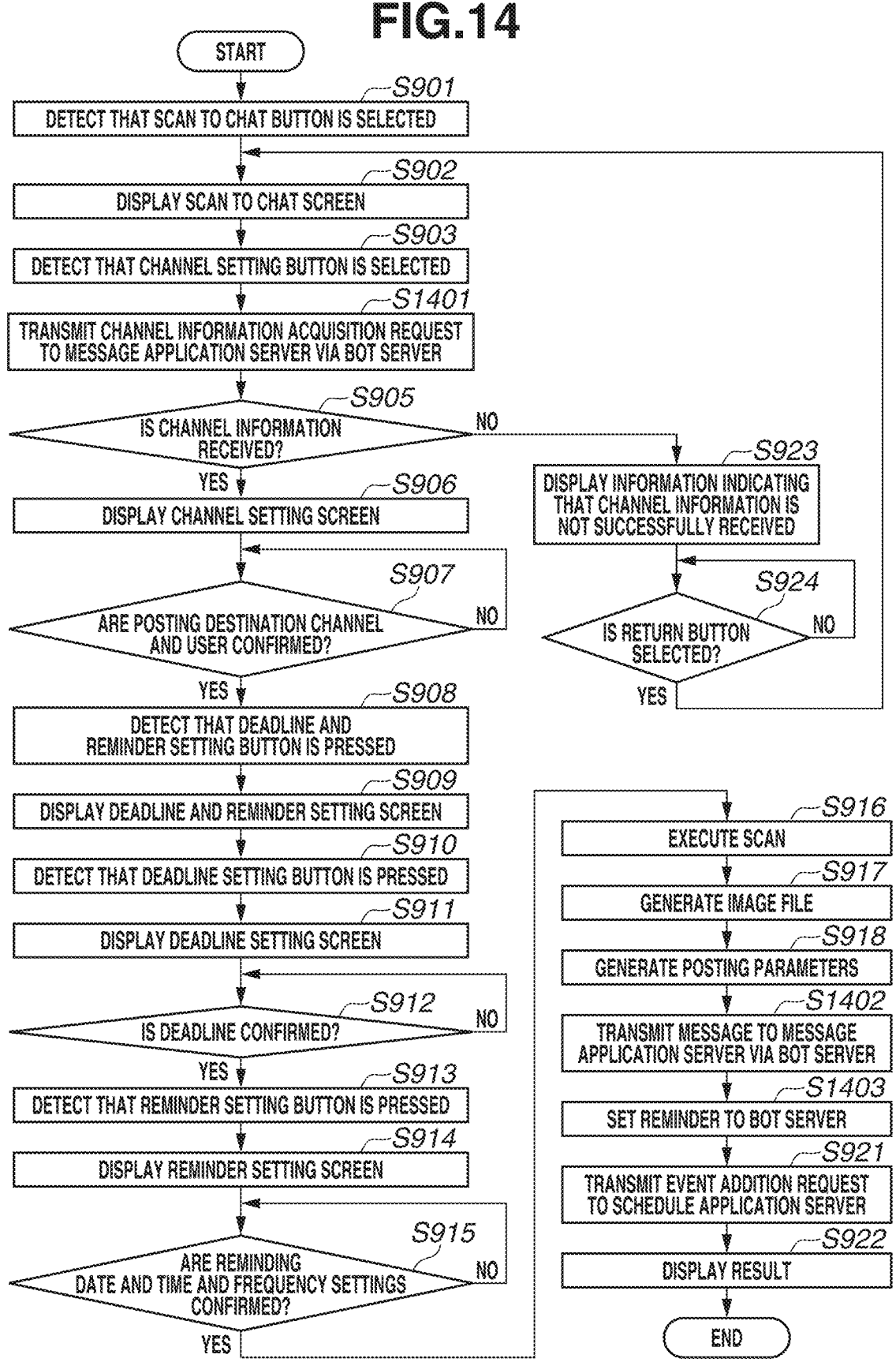
FIG. 14 is a flowchart illustrating an example of scan to chat processing by the image processing apparatus.

FIG. 14 is a flowchart illustrating an example of scan to chat processing by the image processing apparatus 101. The processing of the flowchart in FIG. 14 is performed by the CPU 202 reading a program stored in a ROM 203 into a RAM 204 and executing the program.

The processes of steps S901 to S903 are the same as those described in the first exemplary embodiment.

In step S1401, the CPU 202 of the image processing apparatus 101 transmits a channel information acquisition request to the message application server 400 via the bot server 500.

The processes of steps S905 to S918 are the same as those described in the first exemplary embodiment.

In step S1402, the CPU 202 transmits a message to the message application server 400 via the bot server 500 based on the channel information confirmed in step S907, the image file generated in step S917, and the posting parameters generated in step S918.

In step S1403, the CPU 202 of the image processing apparatus 101 sets the reminder confirmed in step S915 to the bot server 500. In the present exemplary embodiment, a reminder message is transmitted by the bot server 500 and posted by the message application server 400.

The processes of steps S921 to S924 are the same as those described in the first exemplary embodiment.

Figure 15:
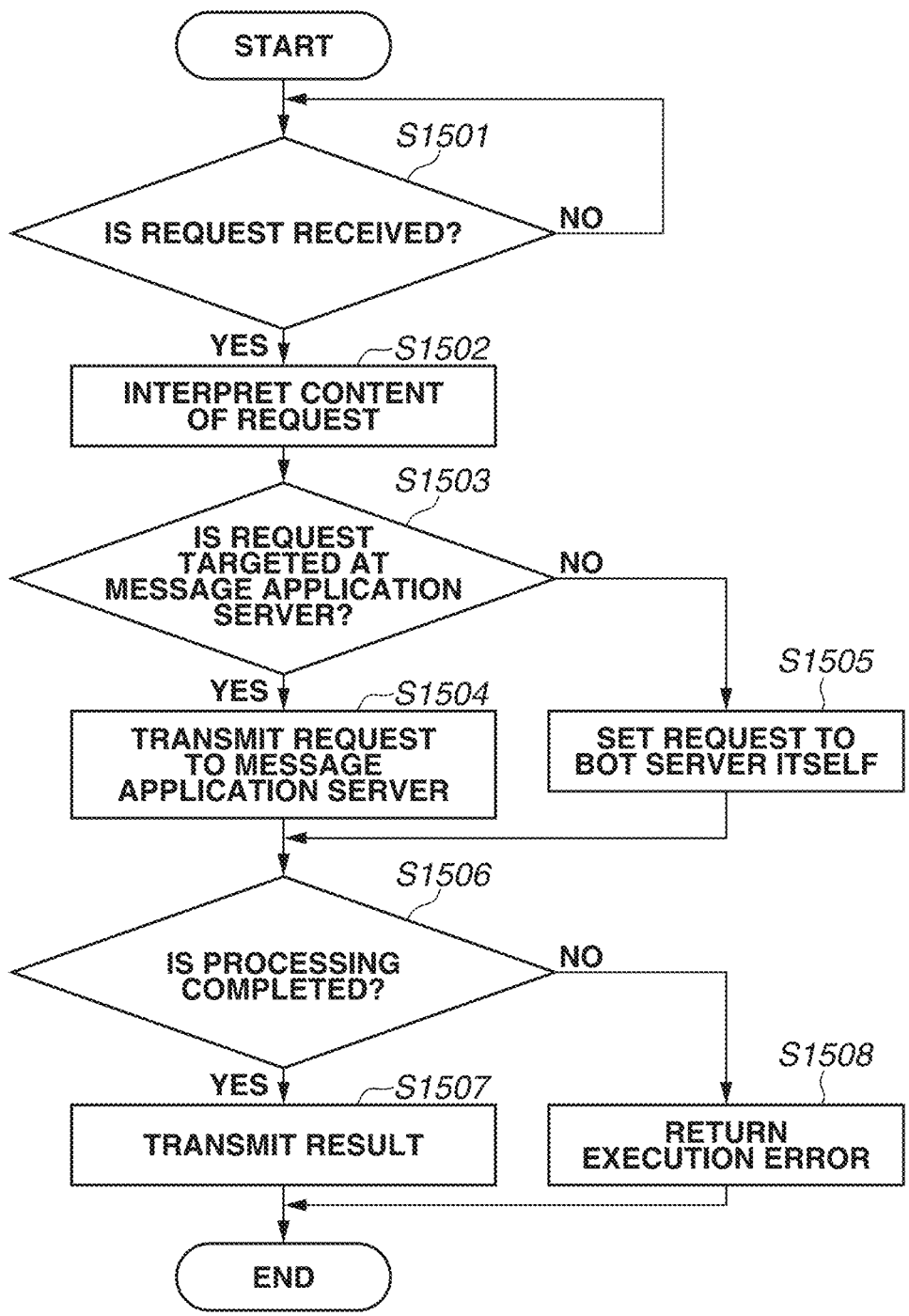
FIG. 15 is a flowchart illustrating an example where the bot server processes a request from the image processing apparatus.

FIG. 15 is a flowchart illustrating an example where the bot server 500 processes a request from the image processing apparatus 101. The processing of the flowchart in FIG. 15 is performed by the CPU 501 reading a program stored in a ROM 502 into a RAM 503 and executing the program.

In step S1501, the CPU 501 determines whether a request from the CPU 202 of the image processing apparatus 101 is received. If a request is determined to be received (YES in step S1501), the processing proceeds to step S1502. If a request is determined to be not received (NO in step S1501), the processing returns to step S1501.

In step S1502, the CPU 501 of the bot server 500 interprets the content of the request received from the image processing apparatus 101.

In step S1503, the CPU 501 of the bot server 500 checks the target of the request interpreted in step S1502. If the request is targeted at the message application server 400 (YES in step S1503), the processing proceeds to step S1504. If the request is targeted at the bot server 500 (NO in step S1503), the processing proceeds to step S1505.

In step S1504, the CPU 501 of the bot server 500 transmits the request interpreted in step S1502 to the message application server 400. Examples of the request include a file upload request.

In step S1505, the CPU 501 of the bot server 500 sets the request interpreted in step S1502 to the bot server 500 itself. Examples of the request include a reminder setting request.

In step S1506, the CPU 501 of the bot server 500 determines whether the processing performed in step S1504 or S1505 is completed. If the processing is normally completed (YES in step S1506), the processing proceeds to step S1507. If the processing is not normally completed (NO in step S1506), the processing proceeds to step S1508.

In step S1507, the CPU 501 of the bot server 500 transmits the result indicating that the processing is normally completed to the image processing apparatus 101.

In step S1508, the CPU 501 of the bot server 500 returns an execution error to the image processing apparatus 101.

Figure 16:
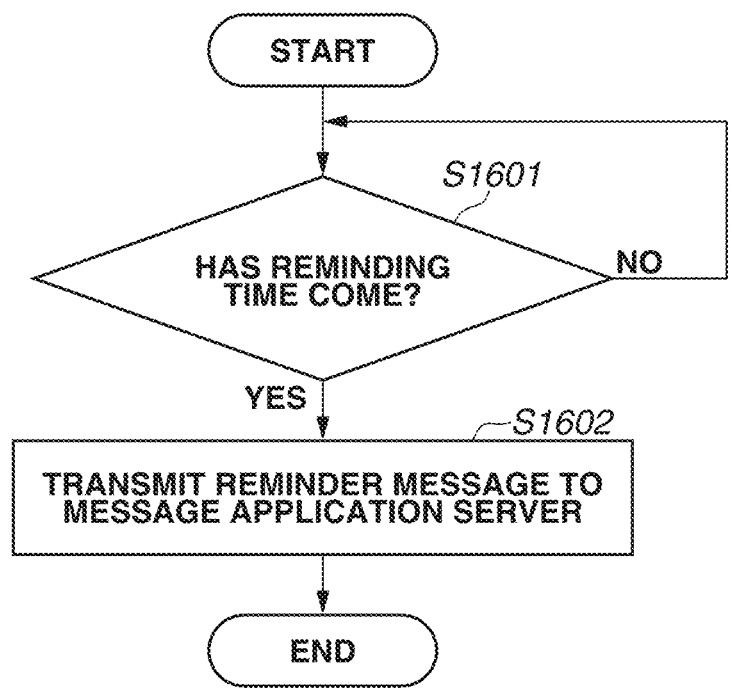
FIG. 16 is a flowchart illustrating an example where the bot server transmits a reminder set by the image processing apparatus.

FIG. 16 is a flowchart illustrating an example where the bot server 500 transmits the reminder set by the image processing apparatus 101. The processing of the flowchart in FIG. 16 is executed by the CPU 501 reading a program stored in the ROM 502 into the RAM 503 and executing the program.

In step S1601, the CPU 501 of the bot server 500 determines whether the reminder time has come. If the reminder time has come (YES in step S1601), the processing proceeds to step S1602. If the reminder time has not come yet (NO in step S1601), the processing returns to step S1601.

In step S1602, the CPU 501 of the bot server 500 transmits the reminder message to the message application server 400.

According to the present exemplary embodiment, if the interface specifications of the message application server 400 are changed, the scan to chat processing can be implemented by simply updating the programs of the bot server 500 without updating the programs of the image processing apparatus 101. Moreover, in a workplace where a plurality of image processing apparatuses 101 is installed, file posting can be implemented without individually setting tokens for the respective image processing apparatuses 101. In addition, the bot server 500 can transmit reminders even if the message application server 400 does not have the reminder function.

In the first exemplary embodiment, the reminder message is described to be transmitted from the message application server 400. In the second exemplary embodiment, the reminder message is described to be transmitted from the bot server 500. However, the reminder message does not necessarily need to be transmitted from the message application server 400 or the bot server 500. For example, the image processing apparatus 101 may store the ID information about the login user in performing the scan to chat processing, and transmit a reminder message using the user account. In such a case, information such as the reminder date and time, the frequency, and the user account is stored in the image processing apparatus 101.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2023-017586, filed Feb. 8, 2023, which is hereby incorporated by reference herein in its entirety.

What is claimed is:

1. An image processing apparatus comprising:
   a scanning unit configured to scan an image of a document and generate image data;
   an acceptance unit configured to accept selection of a channel of a chat service; and
   a transmission unit configured to transmit information about the selected channel and the generated image data to a server configured to manage the chat service,
   wherein the acceptance unit is further configured to accept designation of reminder timing and a message,
   wherein the transmitted image data is posted to the selected channel based on the information about the selected channel,
   wherein the transmission unit is configured to transmit the message to the server based on the designated reminder timing, and
   wherein the message is posted to the selected channel based on the information about the selected channel, the message being posted quoting the posted image data.

2. The image processing apparatus according to claim 1, further comprising:
   a reception unit configured to receive information about a plurality of channels of the chat service from the server; and
   a display unit configured to display the information about the plurality of channels received by the reception unit,
   wherein the acceptance unit is configured to accept the selection of the channel from the displayed information about the plurality of channels.

3. The image processing apparatus according to claim 1, further comprising a storage unit configured to store the information about the selected channel,
   wherein the transmission unit is configured to transmit the information about the selected channel stored in the storage unit and the message to the server based on the designated reminder timing.

4. The image processing apparatus according to claim 1, wherein the transmission unit is configured to transmit a request to quote the posted image data in posting the message to the server based on the designated reminder timing.

5. The image processing apparatus according to claim 1, wherein the acceptance unit is configured to accept the designation of the message by accepting selection of the message from a plurality of messages stored in the image processing apparatus.

6. The image processing apparatus according to claim 1, wherein the acceptance unit is configured to accept the designation of the message by accepting input of the message.

7. The image processing apparatus according to claim 1, further comprising a conveyance unit configured to convey the document,
   wherein the scanning unit is configured to scan the image of the document conveyed by the conveyance unit and generate the image data, and
   wherein the transmission unit is configured to transmit the image data to the server.

8. The image processing apparatus according to claim 1, wherein processing where the scanning unit scans the image of the document and generates the image data and processing where the transmission unit transmits the image data to the server are executed based on acceptance of an execution instruction from a user by the acceptance unit.

9. An image processing method comprising:
   scanning an image of a document and generating image data;
   accepting selection of a channel of a chat service; and
   transmitting information about the selected channel and the generated image data to a server configured to manage the chat service,
   wherein designation of reminder timing and a message is further accepted,
   wherein the transmitted image data is posted to the selected channel based on the information about the selected channel,
   wherein the message is transmitted to the server based on the designated reminder timing, and
   wherein the message is posted to the selected channel based on the information about the selected channel, the message being posted quoting the posted image data.

10. The image processing method according to claim 9, further comprising:
    receiving information about a plurality of channels of the chat service from the server; and
    displaying the received information about the plurality of channels,
    wherein the selection of the channel is accepted from the displayed information about the plurality of channels.

11. The image processing method according to claim 9, further comprising storing the information about the selected channel,
    wherein the stored information about the selected channel and the message are transmitted to the server based on the designated reminder timing.

12. The image processing method according to claim 9, wherein a request to quote the posted image data in posting the message is transmitted to the server based on the designated reminder timing.

13. The image processing method according to claim 9, wherein the designation of the message is accepted by accepting selection of the message from a plurality of messages stored in a storage device.

14. The image processing method according to claim 9, wherein the designation of the message is accepted by accepting input of the message.

15. The image processing method according to claim 9, further comprising conveying the document,
    wherein the image data is generated by scanning the image of the conveyed document, and
    wherein the image data is transmitted to the server.

16. The image processing method according to claim 9, wherein processing where the image of the document is scanned to generate the image data and processing where the image data is transmitted to the server are executed based on acceptance of an execution instruction from a user.

17. A non-transitory computer-readable storage medium storing a program for causing a computer to perform an image processing method comprising:

scanning an image of a document and generating image data;
accepting selection of a channel of a chat service; and
transmitting information about the selected channel and the generated image data to a server configured to manage the chat service,
wherein designation of reminder timing and a message is further accepted,
wherein the transmitted image data is posted to the selected channel based on the information about the selected channel,
wherein the message is transmitted to the server based on the designated reminder timing, and
wherein the message is posted to the selected channel based on the information about the selected channel, the message being posted quoting the posted image data.

* * * * *